Aug. 10, 1937.   A. LORDO   2,089,614

PISTON EXPANDER

Filed May 16, 1935

INVENTOR:
Alphonse Lordo.
BY Fredk. J. Harson
ATTORNEY.

UNITED STATES PATENT OFFICE 2,089,614

PISTON EXPANDER

Alphonse Lordo, St. Louis, Mo.

Application May 16, 1935, Serial No. 21,822

10 Claims. (Cl. 309—12)

My invention relates to a device for expanding split skirts of pistons for internal combustion engines and the like.

The object of my invention is to provide a piston skirt expander formed of flat flexibly resilient metal comprising an inverted U-shaped structure, consisting of two like sections, with an opening therebetween, and depending apertured ears projecting downwardly from the side edges of the device to be supported by wrist pin bosses within a piston.

A further object of my invention is to provide a piston skirt expander formed of flat flexibly resilient, or spring metal and comprising opposed like expanding sections connected by diverging arms terminating to form split apertured ears provided with outer facial recesses to support the expander from the wrist pin bosses on a split skirt piston.

A further object of the invention is to provide the expanding sections of the expander with a plurality of outwardly directed edge projections.

A further object of the invention is to provide an inverted approximately U-shaped piston skirt expander having a central cutaway portion and split side ear sections provided with outer facial recesses for mounting the expander for support upon the wrist pin bosses of a piston free from contact with the wrist pin.

A still further object of the invention is the provision of a split piston skirt expander which will restore worn and collapsed aluminum pistons to their original fit and efficiency, thereby eliminating piston slap and assuring full cylinder contact.

A still further object of the invention is the provision of a piston expander, which is extremely light in weight due to its skeleton form, one that will not interfere with lubrication of the wrist pin and its bearing, and which is mounted for support upon wrist pin bosses and free from contact with the wrist pin.

A still further object of the invention is the provision of a piston expander which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawing forming a part of this specification, wherein like characters of reference denote similar parts throughout the several views.

Figure 1:
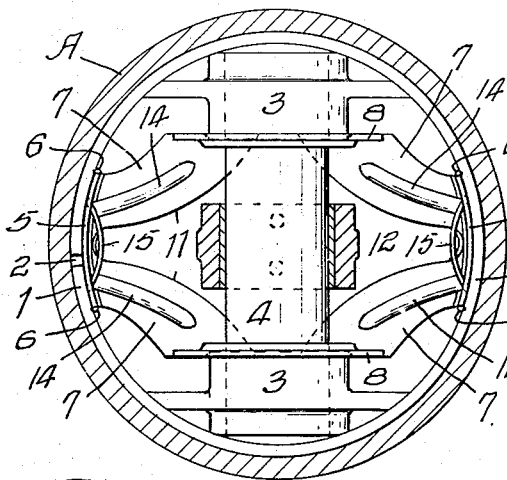
Fig. 1 is a bottom plan view of a piston showing one embodiment of the expander applied thereto.
Figure 2:
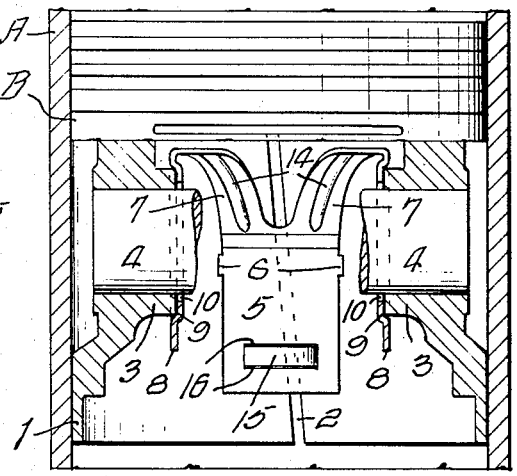
Fig. 2 is a vertical sectional view of a piston and showing the expander mounted therein upon the wrist pin bosses.
Figure 3:
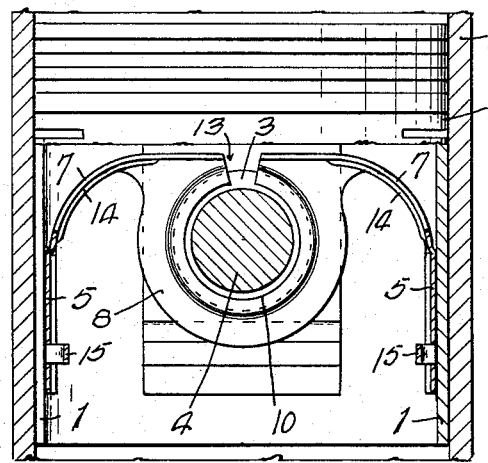
Fig. 3 is a vertical sectional view of a piston, taken at a right angle to Fig. 2, and showing the expander mounted in operative position therein.
Figure 4:
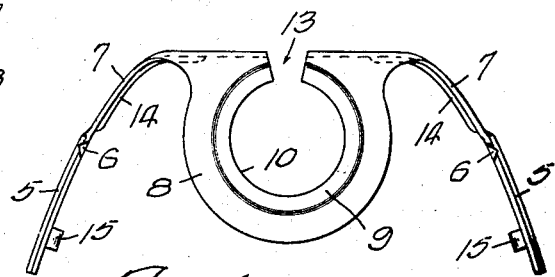
Fig. 4 is a side elevation of the expander.
Figure 5:
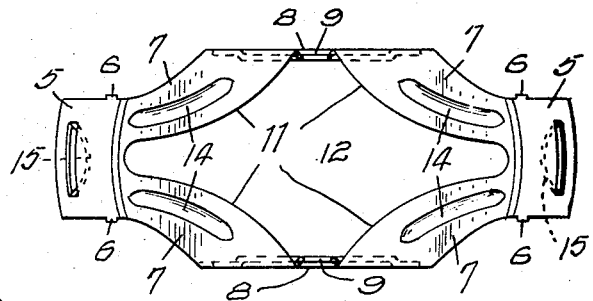
Fig. 5 is a top plan view of the expander.

Referring to the drawing, the reference character A designates a cylinder wall and B designates a piston provided with a skirt 1 which is provided with an expansion slot 2 and with opposed wrist pin bosses 3 adapted to carry a wrist pin 4.

In carrying out my invention, I employ a one piece piston expander formed of flat flexibly resilient, or spring metal.

When formed into final shape, the expander, as a unit, comprises an inverted U-shaped skeleton structure including at its ends opposed like expander sections 5 preferably, although not necessarily, provided at their marginal edges with a plurality of suitable outward projections 6, which are adapted to engage the inner faces of the piston skirt 1 with one of said expander sections 5 spanning the skirt slot 2.

Integral with the upper ends of each of the opposed expander sections 5, are a pair of upwardly and inwardly curved diverging flexibly resilient arms 7. The inner ends of each pair of arms terminate on each side of the device to form split ears 8, which project downwardly, and each ear is provided with an outer facial recess 9 bounding the edge of a wrist pin opening 10 formed therein.

An irregularly shaped opening 11 is formed in the top of the expander between the diverging arms 7, thus providing an oil passage 12 for the downward flow of oil through the passage to effect lubrication of the wrist pin 4 and a bearing of a connecting rod mounted on the wrist pin 4. It will thus be clearly apparent, that the major portion of the expander is of skeleton form carrying plate like sections at the ends only thereof. The passage 12 at its sides adjacent the ears 8 communicate with the wrist pin openings 10 due to the gaps 13 at the upper ends of the ears 8. The arms 7 are provided with suitable longitudinal depressions 14 to provide beads to stiffen the resiliency thereof to cause the expander sections 5, to exert the desired outward pressure against opposed portions of the split skirt 1 of the piston to expand the piston skirt against the cylinder wall B to eliminate piston slap and assuring full cylinder wall contact.

Figure 6:
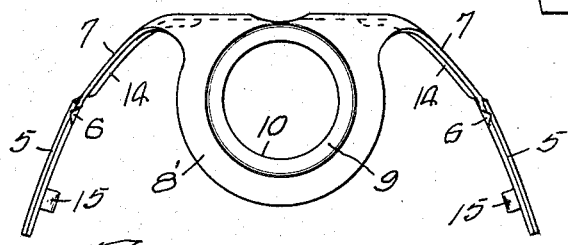
Fig. 6 is a side elevation of the expander showing a modified form of supporting ears.
Figure 7:
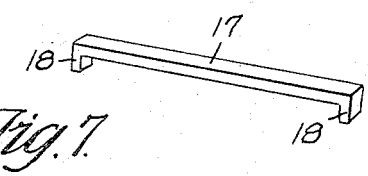
Fig. 7 is a perspective view of a bar for inserting the expander into and removing it from within the piston skirt.

In the modification shown in Fig. 6, it will be observed that I eliminate the ear gaps 13 in which instance the ears designated 8' are not split, as shown in Fig. 6. In the modified form of expander, the resiliency or expanding qualities thereof is a little stiffer than in the preferred form of expander. This of course is dependent upon the gauge of metal employed.

The plate-like end sections 5 of the device may be provided with tool gripping members 15 formed by transversely slitting the expander sections 5, as at 16, and forcing the metal inwardly in arcuate formation. It will thus be seen that I provide means against which a suitable bar 17, having flanged ends 18, may be pressed to force the expander into position within the piston skirt, and which can engage said means for removing the expander from within the piston skirt.

It will be observed that the expander sections 5 press outwardly against the inner face of the piston skirt with the desired force to expand the piston skirt and maintain it at all times in its expanded relation to the cylinder wall to avoid piston slap and excessive blow-by of oil.

It will also be observed that I support the expander by the ears 8 which also press outwardly, and which are provided with the outer facial recesses to receive the inner ends of the wrist pin bosses upon which the ears are mounted free from contact with the wrist pin. The expander is virtually snapped into position between the wrist pin bosses for support thereby.

Due to the opening or passage in the top of the expander, it will be apparent that the expander is flexibly resilient longitudinally, as well as transversely, thereby permitting the ears and expander sections to yield in applying the device to a piston and yet exert the desired force to expand transversely to hold the same on and around the wrist pin bosses free from contact with the wrist pins, and to expand longitudinally to cause the expander sections to expand the split piston skirt and hold it in its expanded relation against a cylinder wall.

The many advantages of the herein described invention will readily suggest themselves to those skilled in the art to which it appertains.

What I claim is:

1. A piston skirt expander formed of flexibly resilient metal and comprising opposed like expander sections terminating in diverging sections, which in turn terminate in split apertured ears having outer facial recesses to permit the expander to be supported by the wrist pin bosses of a piston.

2. A piston skirt expander formed of flexibly resilient metal and comprising opposed like expander sections, outwardly directed marginal projections on said sections, the inner ends of said sections terminating in diverging sections, which in turn terminate in split apertured ears having outer facial recesses to permit the expander to be supported by the wrist pin bosses of a piston.

3. A piston skirt expander formed of flexibly resilient metal, said expander being approximately U-shaped in side elevation and comprising opposed like end sections, and a split apertured section terminating in split ears provided with outer facial recesses.

4. A piston skirt expander comprising opposed piston skirt embracing members, marginal projections on said members adapted to engage the inner wall of the split skirt of a piston intermediate wrist pin bosses on the piston, the inner ends of said members terminating in diverging arms, and said arms terminating to form opposed split ears disposed at right angles to said members, and said ears being provided with outer facial recesses to receive the inner opposed edges of wrist pin bosses on the piston.

5. The combination with a piston having a split skirt and wrist pin bosses, of an approximately U-shaped spring expander provided with like opposed sections adapted to press outwardly against the split wall of the piston, split apertured ears on the expander having outer facial recesses to receive the inner ends of the wrist pin bosses for supporting the expander, and flexibly resilient diverging arms connecting the like opposed sections with the split ears.

6. In a piston skirt expander, opposed like flexibly resilient piston wall embracing sections, opposed flexibly resilient ears provided with outer facial recesses, and flexibly resilient diverging arms connecting the opposed sections, the opposed piston wall embracing sections and the diverging connecting arms being shaped to a U-shaped formation to provide an oil drain opening.

7. A piston skirt expander comprising opposed piston wall contact members, upwardly curved diverging arms integral with the upper ends of the piston wall contact members, ears having wrist pin openings depending from the upper ends of said arms, the outer faces of said ears being depressed surrounding the edge of the wrist pin openings to effect seats for the inner ends of wrist pin bosses on the piston to engage to support the expander independently and free from contact with the wrist pin, and the curved diverging arms forming a lubricant passage in the top of the expander.

8. In a device of the class described, an inverted U-shaped member formed of spring metal and including piston wall engaging members and curved bifurcated sections to provide a passage therebetween, wrist pin boss engaging ears formed on each side of said members, and said ears having wrist pin receiving openings and provided with outer facial recesses to receive the wrist pin bosses of a piston for supporting the device independently of a wrist pin.

9. A one piece metal piston skirt expander comprising an inverted U-shaped structure including two pairs of curved flexibly resilient spaced apart arms terminating at their lower ends in plate like piston skirt engaging sections, each pair of said arms being spaced apart at their upper ends and terminating in depending apertured formations provided with outer facial recesses bordering the apertures.

10. A piston skirt expander formed of metal comprising opposed plate like piston skirt engaging sections terminating upwardly and inwardly in flexibly resilient spaced arm like sections, which in turn terminate in depending split apertured ear formations having outer facial recesses enabling the expander to be supported by the wrist pin bosses on a piston.

ALPHONSE LORDO.